United States Patent [19]

Miyazaki et al.

[11] Patent Number: 4,814,208
[45] Date of Patent: Mar. 21, 1989

[54] FINISH COATING METHOD

[75] Inventors: Shizuo Miyazaki, Okazaki; Norio Fujita, Nagoya, both of Japan

[73] Assignees: Toyota Jidosha Kabushiki Kaisha, Toyota; Kansai Paint Company, Limited, Amagasaki, both of Japan

[21] Appl. No.: 105,758

[22] Filed: Oct. 7, 1987

[30] Foreign Application Priority Data

Oct. 9, 1986 [JP] Japan .............................. 61-240667

[51] Int. Cl.$^4$ .......................... B05D 1/36; B05D 7/00
[52] U.S. Cl. ............................. 427/402; 427/407.1; 427/409
[58] Field of Search .................. 427/407.1, 409, 402

[56] References Cited

U.S. PATENT DOCUMENTS

| | | | |
|---|---|---|---|
| 4,539,258 | 9/1985 | Panush | 428/324 |
| 4,546,007 | 10/1985 | Abe et al. | 427/8 |
| 4,551,491 | 11/1985 | Panush | 524/31 |
| 4,680,204 | 7/1987 | Das et al. | 427/409 X |

FOREIGN PATENT DOCUMENTS

| | | |
|---|---|---|
| 51-38322 | 3/1976 | Japan . |
| 58-166961 | 10/1983 | Japan . |
| 59-160571 | 9/1984 | Japan . |
| 59-215857 | 12/1984 | Japan . |
| 59-216659 | 12/1984 | Japan . |
| WO84/01909 | 5/1984 | PCT Int'l Appl. . |

*Primary Examiner*—Michael Lusignan
*Attorney, Agent, or Firm*—Armstrong, Nikaido, Marmelstein & Kubovcik

[57] ABSTRACT

Disclosed is a coating method comprising the steps of applying a color coating composition, applying a coating composition containing a pigment capable of producing a metallic effect to the layer of the color coating composition and applying a clear coating composition to the layer of the pigment-containing coating composition, characterized in that the color coating composition is able to form a layer having a Munsell value of 0 to 6; that the pigment-containing coating composition contains an iron oxide pigment and a vehicle as main components, the iron oxide pigment being iron oxide particles which contain at least 80% by weight of α-iron oxide crystals and which are each coated with titanium dioxide; that about 90% by weight or more of the iron oxide pigment has a longitudinal size of about 30 μm or less than 40% by weight or more of the pigment has a longitudinal size of about 5 to about 15 μm; that the thickness of the pigment is about 1/10 to about 1/20 of the longitudinal size of the pigment; and that the amount of the pigment is about 0.1 to about 30 parts by weight per 100 parts by weight of the vehicle (as solids).

8 Claims, No Drawings

FINISH COATING METHOD

The present invention relates to a novel finish coating method.

High-grade finish coating methods are known for producing a finish coat of sparkling luster on the automotive body panels and the like. The methods frequently used comprise, after or without applying a color coating material, applying a metallic coating material containing a metallic flake pigment such as aluminum powder and a clear coating material. However the methods have the drawbacks of forming a finish coat unsatisfactory in sparkling luster and providing a finish coat with substantially no sparkling luster, when intended for deep colored coat. Further the finish coat given by the methods looks lusterless or dull in luster when viewed at an angle other than the angle of specular reflection or, in other words, produces a substantial flip-flop effect, hence undesirable in appearance. Moreover, the aluminum powder used is susceptible to chemical change due to acids and alkalis so that the finish coat tends to create blisters and blotches which lower the serviceability of the coat. With these defects, aluminum powders and the like are inadequate to use in application of high-grade finish coats on the automotive body panels and so on, and pose the problems such as diminish of serviceability.

To overcome these problems, it was proposed to use, as a pigment capable of producing a metallic effect, a mica pigment, i.e. mica particles coated with titanium dioxide or like metallic oxide, in place of aluminum powder or like metallic pigments (U.S. Pat. No. 4,539,258). The mica pigment, which is the coated mica particles of plate crystals, produces an interference color between incident light beam reflected on the surface of titanium dioxide film and other incident light beam passed through the film and reflected on the surface of mica core, and has a pearly luster provided by repeated incidence and reflection of light beams between the layers within mica particles. However, the mica pigment is further inferior in sparkling luster to aluminum powders and entails the following additional problem in laying out a color design using a mica pigment. In use of mica pigment, different interference colors are produced due to the various thicknesses of the films covering the mica particles. Consequently, for example, if some light beam falls on the mica pigment, reflects back with a interference color, strikes another mica pigment of different thickness and is permitted to pass through the mica core particle, there occurs a mingle of two different interference colors. Since the mingle of interference colors reduces the color intensity, the desired color design becomes difficult to achieve. Particularly in case of complementary color, the mixed interference colors may become colorless. Accordingly a mingle of colors should be avoided in conceiving a color design using such mica pigment which is responsible for the serious problem of involving a limited gamut of color.

It is an object of the present invention to provide a novel coating method capable of forming a finish coat, even when deep colored, having a noticeably sparkling luster.

It is another object of the invention to provide a novel coating method capable of forming a finish coat which produces little or no flip-flop effect and which looks sparkling when viewed from any direction.

It is a further object of the invention to provide a novel coating method capable of forming a finish coat of sparkling luster which possesses the desired serviceability of coat owing to its high resistance to acids and alkalis.

It is a still further object of the invention to provide a novel coating method enabling the preparation of a color design without regard to the mixture of interference colors and thereby making it possible to form a finish coat in any desired gamut of color.

These and other objects of the present invention will become more apparent from the following description.

The present invention provides a coating method comprising the steps of applying a color coating composition, applying a coating composition containing a pigment capable of producing a metallic effect to the layer of the color coating composition and applying a clear coating composition to the layer of the pigment-containing coating composition, characterized in that the color coating composition is able to form a layer having a Munsell value of 0 to 6; that the pigment-containing coating composition contains an iron oxide pigment and a vehicle as main components, the iron oxide pigment being iron oxide particles which contain at least 80% by weight of $\alpha$-iron oxide crystals and which are each coated with titanium dioxide; that about 90% by weight or more of the iron oxide pigment has a longitudinal size of about 30 $\mu$m or less and 40% by weight or more of the pigment has a longitudinal size of about 5 to about 15 $\mu$m; that the thickness of the pigment is about 1/10 to about 1/20 of the longitudinal size of the pigment; and that the amount of the pigment is about 0.1 to about 30 parts by weight per 100 parts by weight of the vehicle (as solids).

We conducted extensive research to overcome the foregoing drawbacks of the prior art finish coating methods and found the following.

(1) When a metallic effect-producing coating composition containing the iron oxide pigment coated with titanium dioxide in place of the aluminum or mica powder is applied to the surface of the layer of color coating composition having a color adjusted to a specific lightness before application of a clear coating composition, even a deep-color finish coat is given a pronounced degree of sparkling luster.

(2) The finish coat thus obtained has substantially no flip-flop effect and looks brilliantly sparkling as viewed from any direction.

(3) The iron oxide pigment has resistance to acids and alkalis sufficient to provide a coat with good serviceability.

(4) The iron oxide particle constituting the core of iron oxide pigment is impervious to light. Consequently a color design can be conceived without heed to the problems that the mixture of different interference colors attributable to the titanium dioxide film may reduce the intensity of color and that the mixture of colors may be limited. This leads to the formation of finish coat in any desired gamut of color.

The present invention has been accomplished based on these novel findings.

It is critical in the present invention to use as a metallic effect-producing pigment an iron oxide pigment prepared by coating iron oxide particles containing at least 80% by weight of $\alpha$-iron oxide crystals with titanium dioxide. The titanium dioxide film covering the iron oxide pigment acts as an optical thin film so that incident light beams are reflected on the surface of titanium dioxide film or are passed through the film to reflect on the surface of iron oxide particle. The iron oxide particle forming the core of the pigment is a hexagonal opaque plate crystal and has a remarkable metallic luster. As a result, light beams are reflected in a sparkling glitter on reaching the iron oxide surface after passing through the titanium dioxide film. The degree of glitter thus produced is pronouncedly higher than when given by aluminum or mica particles, and particularly this tendency is marked under sunlight. Furthermore, the finish coat formed is practically constant in sparkling luster when viewed from different angles. The pigment exhibits a color as consequence of interference action of light beams due to the titanium dioxide film and the color tone is varied with the optical thickness of titanium dioxide film (geometrical thickness × refractive index). In other words, a color is produced by the displacement of phase resulting from the difference of optical pass between the light beams reflected on the surface of the titanium dioxide film and the light beams passed through the film and reflected on the surface of the iron oxide particles. A color may vary also with the refractive index of the vehicle component in the coating composition containing the iron oxide pigment (hereinafter referred to as "iron oxide pigment-containing coating").

When exposed to the direct rays of the sun or the like, the layer of iron oxide pigment-containing coating as seen from any angle shows a uniquely sparkling metallic luster appearing as if the luster originated in the depth of layer, partly due to the color formation by said interference action and looks three-dimensional. In addition, the iron oxide pigment is high in chemical resistances such as acid resistance and alkali resistance, light resistance, weatherability, heat resistance, adherence to a substrate and the like.

To fully produce the attractive sparkling luster by the iron oxide pigment, the iron oxide pigment-containing coating needs to be applied to the surface of layer of color coating composition (hereinafter referred to as "color coating") having a Munsell value adjusted to 0 to 6. More specifically, when deposited on the layer of color coating controlled to a low value, the iron oxide pigment-containing coating can provide the full extent of glitter unique to the pigment. As a result, the multilayer finish coat looks sparkling as if inlaid with diamonds in the depth. The remarkable characteristics of finish coat as described above can not be obtained by using aluminum or mica powders.

According to the coating method of the present invention, a color design can be easily and desirably conceived by considering the combination of the color of color coating layer and the interference colors of iron oxide pigment covered with titanium dioxide. The two factors so combined as to make their color gamuts close to each other would achieve a synergic effect, resulting in finish coat satisfactory in hiding effect and free of irregular color. Reversely if the combination of two factors is arranged to differentiate their colors as remote as possible, the shining effect unique to the iron oxide pigment can be fully attained. It is possible to freely control the color of the finish coat as seen at an angle other than that of specular reflection.

The finish coating method of the present invention will be described below in greater detail.

First, the color coating will be discussed.

The color coating to be used in the invention comprises a vehicle component and a color pigment as main components and is capable of forming a layer having a Munsell value of 0 to 6, preferably 0.3 to 4. The color coating is applied prior to application of the iron oxide pigment-containing coating. The term "Munsell value" used herein refers to the value among the three attributes of color, i.e. value, hue and chroma. The Munsell value exceeding 6 is inadequate because it makes the finish coat too bright, exceedingly diminishing the degree of sparkling luster originated in the pigment. The value of layer of color coating is easily controllable by determining, e.g., the kind, composition and amount of color pigment contained in the color coating.

The color coating to be used in the present invention is one capable of forming a layer having the value in the above range. Useful color coatings are those which can produce a layer of said lightness and which are in the form of an organic solvent solution, nonaqueous dispersion, water-dispersible solution, aqueous solution, solvent-free form, powder or the like among which an organic solvent solution is preferred to retain the finish appearance, serviceability and the like at high levels.

The vehicle component of the color coating contains a base resin as a main component and when required, a curing agent or crosslinking agent such as amino resins, isocyanate compounds, blocked isocyanate compounds, polyamide resins or the like. The base resin used is one selected from acrylic resins, alkyd resins, polyester resins, epoxy resins and modified resins thereof, etc.

The color coating of the invention can be cured at room temperature or by heating, or in other words can be hardened by crosslinking (curing) or without crosslinking (drying).

It is suitable that the color coating be applied to a thickness of about 10 to about 50 $\mu$m, preferably about 20 to about 35 $\mu$m when cured or dried. Preferably the application thereof is done to cause the layer to completely conceal the surface of substrate.

Next, the iron oxide pigment-containing coating will be discussed below.

The iron oxide pigment-containing coating to be used in the invention is applied to the surface of the color coating layer and contains about 0.1 to about 30 parts by weight of the iron oxide pigment particles per 100 parts by weight of the vehicle component. The pigment particles are composed of iron oxide particles which predominantly contain $\alpha$-iron oxide crystals and which are coated with titanium dioxide, about 90% by weight or more of the pigment being about 30 $\mu$m or less in longitudinal size, about 40% by weight or more thereof being about 5 to about 15 $\mu$m in longitudinal size, and the thickness thereof being about 1/10 to about 1/20 of the longitudinal size thereof.

More specifically, the iron oxide pigment to be used in the present invention each have a core of hexagonal micaceous platelike iron oxide particles containing $\alpha$-iron oxide ($Fe_2O_3$) crystals as the main component and covered in their surface with titanium dioxide. The micaceous platelike iron oxide particle constituting the core contains at least 80% by weight, preferably about 90% by weight or more, more preferably about 98% by weight or more, of $\alpha$-$Fe_2O_3$ but a trace or no amount of $SiO_2$, FeO, Mn or the like (if any, 1% by weight or less). The iron oxide pigment per se have a sparkling luster.

Useful iron oxide pigment coated with titanium dioxide are of hexagonal platelike form having a specific distribution of particle size with respect to a range of longitudinal size. Stated more specifically, it is essential in the invention that about 90% by weight or more, preferably about 95% by weight or more, of the pigment be distributed among about 30 μm or less in longitudinal size and about 40% by weight or more, preferably 50% by weight or more, of those be distributed among about 5 to about 15 μm in longitudinal size, as determined by a laser-type particle size distribution measure device (PARTICLE SIZER 2200, product of Malvern Co., U.K.). Of the pigments of about 5 to about 15 μm longitudinal size, those of about 10 to about 15 μm longitudinal size are suitably used in an amount of about 25% by weight or more, more preferably about 32% by weight or more. The term "longitudinal size" used herein is intended to mean the size as measured in a direction of the diagonal line of virtually equilateral hexagonal pigment surface.

It is also critical in the invention that the thickness of the pigment be about 1/10 to about 1/20, preferably about 1/10 to about 1/15, of the longitudinal size thereof.

If less than 40% by weight of the pigment used has a longitudinal size of about 5 to about 15 μm and a larger amount thereof has a longitudinal size of less than about 5 μm, or if the pigment used has a thickness of less than 1/20 of the longitudinal size, the sparkling luster of the finish coat reduces and thus the pigment of above-defined thickness used in such range of amount is undesirable. If less than 40% by weight of the pigment used has a longitudinal size of about 5 to about 15 μm and a larger amount thereof has a longitudinal size of greater than 15 μm, or if less than 90% by weight thereof has a longitudinal size of less than 30 μm, or if the pigment used has a thickness of greater than 1/10 of the longitudinal size, the coat surface has an increased number of pigment protruded into the upper coat, which leads to the impairment of finish characteristics, hence undesirable.

While an anatase-type titanium dioxide is usually used to cover the surface of the iron oxide pigment in the present invention, a rutile-type titanium dioxide is usable to enhance the weatherability.

The amount of titanium dioxide used to coat the iron oxide particles is about 0.1 to about 30% by weight, preferably about 0.3 to about 30% by weight, based on the weight of iron oxide particles. If the amount of titanium dioxide is less than 0.1% by weight, interference colors are unlikely to occur, whereas if the amount thereof exceeds 30% by weight, the uniquely vivid interference colors are unavailable and the coat tends to become turbid.

The iron oxide pigment can be usually prepared by heat-treating the iron oxide particles in an aqueous solution of titanyl sulfate ($TiOSO_4 \cdot 5.2H_2O$), titanium tetrachloride ($TiCl_4$) or like titanium oxide or the corresponding hydroxide, washing the particles with water, drying them and heating the same at a temperature of about 500° to about 900° C. to crystallize the titanium dioxide layer into anatase or rutile crystals. The color tone of the iron oxide pigment coated with the titanium dioxide thus prepared can be adjusted as desired by determining the kind of the treating agent and the amount of the layer. Available interference colors include, for example, blue, greenish blue, yellow, purple, reddish purple, reddish brown, brownish green and gold colors. Further the pigment thus obtained have a surface excellent in sparkling luster.

When required, the iron oxide pigment to be used in the invention may be heat-treated with an additional metallic oxide such as chromium oxide, aluminum oxide, zirconium oxide, silica or the like. This heat treatment is preferred since it improves the corrosion resistance, weatherability and other properties. A suitable amount of the metallic oxide used for this purpose is about 0.1 to about 5% by weight, preferably about 0.5 to about 2% by weight, based on the weight of the iron oxide particles.

The vehicle component of the iron oxide pigment-containing coating is used to disperse the iron oxide pigment therein for formation of a layer. Useful vehicles include conventional resins used for coating materials and having a high weatherability and desired physical and chemical properties. Most preferred resins are thermosetting resins produced by mixing an acrylic resin, polyester resin or alkyd resin with an amino resin, isocyanate compound, blocked isocyanate compound or like crosslinking agent. Also usable are resins which can dry or cure at ambient temperature. The iron oxide pigment-containing coating is used in the form of usually an organic solvent solution, and possibly a nonaqueous dispersion, water-dispersible solution, aqueous solution, solvent-free form or powder.

The amount of iron oxide pigment coated with titanium dioxide is about 0.1 to about 30 parts by weight, preferably about 5 to about 20 parts by weight, per 100 parts by weight of the vehicle component (as solids). Less than 0.1 part by weight of the oxide pigment used tends to fail to give the sparkling luster unique to the pigment, whereas more than 30 parts by weight of the pigment used is prone to decrease the serviceability of finish coat.

The methods of dispersing the iron oxide pigment in the vehicle component are not specifically limited, but are preferably carried out without vigorous stirring to avoid damaging the titanium dioxide film. The pigment can be easily dispersed therein with a stirrer of the type commonly used.

When required, the iron oxide pigment-containing coating composed predominantly of the iron oxide pigment and vehicle component may further contain any of usual metallic pigments, color pigments, extender pigments, additives for coating materials and the like insofar as the additive used does not adversely affect the intended purpose of the invention.

The iron oxide pigment-containing coating is applied to the surface of the color coating layer by conventional coating methods such as electrostatic coating, air spraying, immersion, airless spraying or the like. The thickness of cured layer is about 10 to about 30 μm, preferably about 15 to about 25 μm.

The clear coating composition (hereinafter referred to as "clear coating") will be described below.

The clear coating to be used in the present invention is applied to the surface of the iron oxide pigment-containing coating layer to form a transparent layer, and contains a vehicle component as the main component. Suitable vehicle component, form of coating composition, coating method and the like can be selected from the examples thereof described above on the iron oxide pigment-containing coating. When required, the clear coating may include a small amount of color pigment, extender pigment, metallic pigment, said mica pigment, iron oxide pigment, ultraviolet absorber and the like.

While specifically not limitative, the thickness of clear coating layer is about 30 to about 70 μm, preferably about 40 to about 60 μm, based on the cured or dried layer.

The fnish coating method of the present invention will be described below.

First, the color coating is applied directly to a chemically treated or untreated substrate (preferably automobiles composed of metals, plastics and the like) or to a substrate covered with priming formed, e.g., by electrodeposition, surfacer or topcoat. Then the iron oxide pigment-containing coating is applied to the surface of color coating layer uncured or undried, or cured or dried. Lastly the clear coating is applied to the surface of the iron oxide pigment-containing coating layer uncured or undried, or cured or dried, followed by curing or drying of the layer(s).

There exists the following relationship between the size of the titanium dioxide-coated iron oxide pigment in the iron oxide pigment-containing coating on one hand and the thickness of the clear coating layer. When the longitudinal size of the pigment is relatively small in the range of the above-specified distribution, a finish coat is given a high distinctness of image gloss by applying the clear coating to a thickness of about 30 to about 50 μm. On the other hand, when the longitudinal size thereof is relatively large within said range, the clear coating is applied preferably to a thickness of about 40 to about 70 μm to provide a finish coat with a high distinctness of image gloss. In this case, if the clear coating is difficult to apply to a thickness of 40 μm or more by one application, the clear coating may be twice applied. The two applications of clear coating are effected preferably by, e.g. depositing the iron oxide pigment-containing coating and the clear coating (in first application) on a wet-on-wet coating method, curing or drying the layers, polishing when required, the cured or dried layers, depositing the clear coating (in second application), and curing or drying the layer.

The curing in these coating methods is three-dimensionally crosslinking of the layer(s) for curing at room temperature or at an elevated temperature, and the drying is drying of the layer(s) by simple evaporation of the solvent to achieve the formation of the layer(s). The thermally curing temperature can be suitably determined by varying the composition of vehicle used.

It is possible in the coating method of the invention to control the gamut of color chiefly by combining the colors of color coating and interference colors of titanium dioxide-coated iron oxide pigment.

According to the present invention, the following remarkable results can be accomplished.

(1) The titanium dioxide-coated iron oxide pigment used in the present invention has a twofold color effect, i.e. an effect of metallic color and solid (non-metallic) color. More specifically, when exposed to the direct rays of the sun, the pigment is able to produce a uniquely sparkling luster markedly superior to that obtained by aluminum or mica powder, but shows a solid color tone in the shade.

(2) Under the direct rays of the sun, the finish coat of the invention is substantially free of flip-flop effect. Further the finish coat of the invention shows the same degree of sparkling luster when viewed at any deflected angle as well as the angle of specular reflection. In addition, the finish coat of the invention glitters not only at the surface thereof but also in its depth as if diamonds were laid in the coat, and looks three-dimensional. Such remarkable degree of sparkling luster, moreover, can be attained even in the finish coat of deep color.

(3) In preparation of a color design using said mica powder, the mixture of different interference colors should be avoided in view of diminished color effect. However, the iron oxide pigment used in the invention makes viable the mixture of various interference colors and rather broadens the variations of colors available. The mixture of interference colors is induced to present individual colors so that the finish coat is seen sparkling in various colors and can achieve a unique color effect.

(4) The combination of additional metallic pigment with the iron oxide pigment used in the invention gives an orientated sparkling luster to the finish coat. More specifically, if a proper amount of said mica powder is combined with the iron oxide pigment, the finish coat as viewed from the angle of specular reflection is perceived as showing the combined colors of constituent color materials in sparkling luster, while the finish coat as viewed from the other angles displays the color of iron oxide pigment in sparkling luster. Such color effect is obtained in the invention because the iron oxide pigment used can exhibit sparkling luster in view from any angle.

(5) The color of finish coat can be controlled over a broad range of gamut by combining the interference colors of iron oxide pigment with the color of color coating layer.

(6) The iron oxide pigment used in the invention has a high resistance to acids and alkalis which leads to finish coat having a satisfactory serviceability.

The present invention will be described below in more detail with reference to the following examples and comparison examples in which the parts and percentages are all by weight.

1. Substrate

The substrate used is one prepared by treating a steel plate with zinc phosphate and coating the treated substrate with a cured 15 μm-thick layer of an epoxy polyamide-type cationic electrocoating composition (trade name "ELECRON No.9000 Black," product of Kansai Paint Co., Ltd.) and a cured 30 μm-thick layer of a surfacer of aminoalkyd resin type (trade name "ES PRIMER TP-16 R GRAY," product of Kansai Paint Co., Ltd.) and heating the two layers for curing.

2. Color coating

The color coatings used were organic solvent solution-type thermosetting coatings I, II and III (including as the solvent a toluene/xylene mixture in a weight ration of 1:1) comprising the components as shown below in Table 1.

TABLE 1

|  | I | II | III |
|---|---|---|---|
| Vehicle components (part) as solids | | | |
| Acrylic resin | 70 | 70 | 70 |
| Butylated melamine resin | 30 | 30 | 30 |
| Pigment components (part) | | | |
| Titanium dioxide | 50 | 10 | |
| Barium sulfate | 10 | 20 | 20 |
| Carbon black | 1 | 2 | 5 |
| Phthalocyanine blue | 4 | 4 | |
| Quinacridone red | 2 | 2 | |
| Color of layer | | | |

TABLE 1-continued

|  | I | II | III |
|---|---|---|---|
| Value | 4 | 2 | 0.4 |
| Chroma | 2.36 | 1.61 | Neutral |
| Hue | 1.06 PB | 5.14 PB | Neutral |

3. Iron oxide pigment-containing coating

The coatings used were organic solvent solution-type thermosetting coatings (a), (b) and (c) (including as the solvent a toluene/xylene mixture in a weight ratio of 1:1) containing the main components as shown below in Table 2.

TABLE 2

|  | (a) | (b) | (c) |
|---|---|---|---|
| Vehicle component (part) as solids |  |  |  |
| Acrylic resin | 70 | 70 | 70 |
| Butylated melamine resin | 30 | 30 | 30 |
| Iron oxide pigment (part) | 10 | 13 | 18 |
| Iron oxide pigment |  |  |  |
| Iron oxide particles |  |  |  |
| $\alpha$-$Fe_2O_3$ content (%) | 99.3 | 99.3 | 99.3 |
| FeO content (%) | 0.1 | 0.1 | 0.1 |
| Mn content (%) | 0.6 | 0.6 | 0.6 |
| Titanium dioxide film (%, rutile type) | 8.2–10.1 | 9.6–11.3 | 10.4–13.8 |
| Chromium oxide (%) | 1.0 | 1.0 | 1.0 |
| Longitudinal size |  |  |  |
| Content of pigment 30 μm or less in size (%) | 97.1 | 97.1 | 97.1 |
| Content of pigment 5 to 15 μm in size (%) | 55.2 | 55.2 | 55.2 |
| Thickness (μm) | 0.4–1.0 | 0.7–1.0 | 0.5–1.0 |

4. Clear coating

The clear coating used was an organic solvent solution-type thermosetting coating (including as the solvent a toluene/xylene mixture in a weight ratio of 1:1) composed pedominantly of 70 parts of acrylic resin and 30 parts of butylated melamine resin as vehicle components.

The color coatings I, II or III, and the iron oxide pigment-containing coatings (a), (b) or (c) and the clear coating as specified above were applied over the coated substrate as defined above under the conditions as indicated below in Table 3.

TABLE 3

|  | Example |  |  |  |  |  |  |  | Comparison Example |  |  |  |
|---|---|---|---|---|---|---|---|---|---|---|---|---|
|  | 1 | 2 | 3 | 4 | 5 | 6 | 7 | 8 | 1 | 2 | 3 | 4 |
| Color coating |  |  |  |  |  |  |  |  |  |  |  |  |
| Kind of coating | I | I | I | II | II | II | III | III | I | II | I | II |
| Layer thickness (μm) | 20 | 25 | 30 | 20 | 25 | 30 | 25 | 25 | 25 | 25 | 25 | 25 |
| Baking *1 | B1 | B1 | B1 | B2 | B2 | B2 | B1 | B1 | B1 | B2 | B1 | B2 |
| Iron oxide pigment-containing coating |  |  |  |  |  |  |  |  |  |  |  |  |
| Kind of coating | (a) | (b) | (c) | (a) | (b) | (c) | (a) | (b) | *2 | *2 | *3 | *3 |
| Layer thickness (μm) | 15 | 20 | 25 | 15 | 20 | 25 | 15 | 20 | 20 | 20 | 20 | 20 |
| Baking *1 | B2 | B2 | B2 | B2 | B1 | B2 | B2 | B1 | B2 | B1 | B2 | B1 |
| Clear coating |  |  |  |  |  |  |  |  |  |  |  |  |
| Layer thickness (μm) | 30 | 25 | 25 | 30 | 30 | 25 | 30 | 30 | 25 | 30 | 25 | 30 |
| Baking *1 | B1 | B1 | B1 | B1 | B1 | B1 | B1 | B1 | B1 | B1 | B1 | B1 |
| Layer thickness (μm) | — | 25 | 25 | — | — | 25 | — | — | 25 | — | 25 | — |
| Baking *1 | — | B1 | B1 | — | — | B1 | — | — | B1 | — | B1 | — |

Note:
*1 B1 means that the layer was baked at 140° C. for 30 minutes.
B2 means that the layer was not baked but was set at room temperature for 5 to 10 minutes, followed by the consequent step.
*2 The iron oxide pigment in the coating was replaced by aluminum powder.
*3 The iron oxide pigment in the coating was replaced by mica particles coated with titanium dioxide.

The layers formed in Examples 1 to 8 and Comparison Examples 1 to 4 on the coated substrates under the conditions as listed above in Table 3 were all tested for sparkling luster, orientation, resistance to acids and resistance to alkalis by the following test methods. Sparkling luster The layers were observed at the angle of specular reflection under the direct rays of the sun and the sparkling luster was evaluated according to the following criterion:

(A) The finish coat was uniformly sparkling in its entirety as if diamonds were laid in the interior of the coat and gave a substantial degree of three-dimensional impression.

(B) The finish coat was unsatisfactory in sparkling luster and in three-dimensional characteristics.

(C) The finish coat was substantially unable to show a sparkling luster and failed to give an three-dimensional impression.

Orientation

The degree of sparkling luster of the finish coat as observed from various angles in the sparkling luster test was evaluated according to the following criterion:

(A) The sparkling luster underwent virtually no change even when the finish coat was viewed from varied angles.

(B) With the increase of deflection from the angle of specular reflection, the degree of sparkling luster lowered.

(C) The degree of sparkling luster was unsatisfactory when the finish coat was observed at any angle.

Resistance to acids

The coated substrate was immersed in a 5% aqueous solution of sulfuric acid for 24 hours and checked for the resistance to acids. The resistance was evaluated according to the following criterion:

(A) No abnormal change (B) The finish coat had small amounts of stains and blisters.

Resistance to alkalis

The finish coat was immersed in a 5% aqueous solution of sodium hydroxide for 24 hours and checked for the resistance to alkalis. The resistance was evaluated according to the following criterion:

(A) No abnormal change.

(B) The finish coat had small amounts of stains and blisters.

Table 4 below shows the results.

TABLE 4

|  | Example | | | | | | | | Comparison Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Sparkling luster | A | A | A | A | A | A | A | A | B | B | C | C |
| Orientation | A | A | A | A | A | A | A | A | B | B | C | C |
| Resistance to acids | A | A | A | A | A | A | A | A | B | B | A | A |
| Resistance to alkalis | A | A | A | A | A | A | A | A | B | B | A | A |

We claim:

1. A coating method comprising the steps of applying a color coating composition to a substrate, applying a coating composition containing a pigment capable of producing a metallic effect to the layer of the color coating composition and applying a clear coating composition to the layer of the pigment-containing coating composition, characterized in that the color coating composition is able to form a layer having a Munsell value of 0 to 6; that the pigment-containing coating composition contains an iron oxide pigment and a vehicle as main components, the iron oxide pigment being iron oxide particles which contain at least 80% by weight of $\alpha$-iron oxide crystals and which are each coated with titanium dioxide; that about 90% by weight or more of the iron oxide pigment has a longitudinal size of about 30 $\mu$m or less and 40% by weight or more of the pigment has a longitudinal size of about 5 to about 15 $\mu$m; that the thickness of the pigment is about 1/10 to about 1/20 of the longitudinal size of the pigment; and that the amount of the pigment is about 0.1 to about 30 parts by weight per 100 parts by weight of the vehicle (as solids).

2. A coating method according to claim 1 wherein the color coating composition is able to give a layer having a Munsell value of 0.3 to 4.

3. A coating method according to claim 1 wherein the iron oxide particles contain 90% by weight or more of $\alpha$-iron oxide crystals.

4. A coating method according to claim 1 wherein 95% by weight or more of the iron oxide pigment has a longitudinal size of about 30 $\mu$m or less.

5. A coating method according to claim 1 wherein 50% by weight or more of the iron oxide pigment has a longitudinal size of about 5 to about 15 $\mu$m.

6. A coating method according to claim 1 wherein the thickness of the iron oxide pigment is about 1/10 to about 1/15 of the longitudinal size of the pigment.

7. A coating method according to claim 1 wherein the amount of the titanium dioxide covering the iron oxide pigment is about 0.1 to about 30% by weight based on the weight of the iron oxide particles.

8. A coating method according to claim 1 wherein the amount of the iron oxide pigment is about 5 to about 20 parts by weight per 100 parts by weight of the vehicle (as solids).

* * * * *